July 23, 1957 H. R. VAN DEVENTER ET AL 2,800,530

TELEPHONE ANSWERING AND RECORDING DEVICES

Original Filed Dec. 17, 1949 6 Sheets-Sheet 1

INVENTORS.

HARRY R. VAN DEVENTER
JOHN J. SHIVELY
PAUL C. BAILEY
BY Van Deventer & Shively
ATTORNEYS INVENTORS
HARRY R. VAN DEVENTER
JOHN J. SHIVELY
PAUL C. BAILEY
BY Van Deventer & Shively
ATTORNEYS.

TELEPHONE ANSWERING AND RECORDING DEVICES

July 23, 1957 H. R. VAN DEVENTER ET AL 2,800,530

TELEPHONE ANSWERING AND RECORDING DEVICES

Original Filed Dec. 17, 1949 6 Sheets-Sheet 4

TELEPHONE ANSWERING AND RECORDING DEVICES

Original Filed Dec. 17, 1949 6 Sheets-Sheet 5

INVENTORS.
HARRY R. VAN DEVENTER
JOHN J. SHIVELY
PAUL C. BAILEY
BY Van Deventer & Shively
ATTORNEYS.

INVENTOR.

BY

United States Patent Office 2,800,530

Patented July 23, 1957

2,800,530

TELEPHONE ANSWERING AND RECORDING DEVICES

Harry R. Van Deventer and John J. Shively, New York, N. Y., and Paul C. Bailey, Ivyland, Pa., assignors, by mesne assignments, to Telephone Answering and Recording Corporation, New York, N. Y., a corporation of Delaware Original application December 17, 1949, Serial No. 133,506. Divided and this application January 9, 1952, Serial No. 265,632

24 Claims. (Cl. 179—6)

This invention relates to telephone answering devices which may also be used to record messages received over a telephone line circuit and is of the type using records which may be of any desired type, and is a division of application Serial No. 133,506, filed December 17, 1949.

A record may be made, hereinafter termed a "talkout message" and will be delivered to the calling party via the telephone line. Then, if desired, the calling party may speak and the incoming speech will be recorded on another record, which the user of the device can play back at will.

A recording device to be used in conjunction with a telephone circuit for the purpose of answering said telephone and recording the received message in the absence of persons in its vicinity, should have many features not common to ordinary recording and playback devices. Said features, to be described, relate not only to the mechanical efficiency of the apparatus, but also to the simplifying of its operation and to the safety of the operator, the apparatus and its appurtenances, keeping in mind the fact that the device will be used principally by persons mechanically and electrically unskilled.

It is further desirable that, despite the compact form the device must assume, repairs, when necessary, be readily accomplished without the necessity of removing the instrument from its installed location or completely disassembling the apparatus to replace a part.

Objects of the invention are:

To provide a telephone answering device that can be used with a telephone instrument, the latter being a separate unit, so that any standard telephone instrument may be connected to said device by means of the usual cord and a plug or terminal strip. No changes in the interior wiring of the telephone are necessary.

To provide means in the device for switching said separate telephone instrument so that the transmitter thereof may be used as a microphone for the answering device for the purpose of recording, and the receiver thereof used as a speaker for the purpose of listening to the playing back of messages recorded by the answering device.

To provide means in said answering device for switching said telephone instrument to a telephone line circuit so that while used as a normal telephone the conversation over said line circuit may be recorded in said device.

To provide means in said answering device for switching said telephone instrument so that when it is used as a normal telephone, there will be nothing else in the answering device circuit connected to the telephone line to disturb the measured balance thereof, and so that a wire chief in testing the line to which the answering device is connected will obtain the same reading as that of a line connected to a standard telephone.

To provide means whereby, when the answering device is being used to answer incoming calls, the telephone instrument with its associated ringer is disconnected from the circuit and a relay, known as the ringing relay with its associated condenser, is substituted, said relay and condenser having the same effective values as the ringer and condenser in the telephone instrument so that when the device is left to answer incoming calls, the wire chief in testing the line to which the device is connected will obtain the same reading as that of a line connected to a standard telephone.

As the telephone is disconnected when the machine is connected to answer incoming calls, it is an important object to provide means on the device which duplicates the normal function of the telephone hook switch in placing an impedance across the line to operate the supervisory relay (or its equivalent on dial systems) at the exchange when the device answers an incoming call.

To provide improved means, in one form of the device, for adjusting the point at the end of the talkout message where a shift of circuits occurs from playout to record-in.

To provide a further improved method whereby no adjustment is required at either the start or the end of the talkout message regardless of the length of said message.

To present an improved method for fixing the starting point of the talkout record when ready to record same.

To provide a tone warning signal and means for repeating same as an integral component of the device.

To provide a combined timing means for cyclically repeating the tone warning signal with means for timing of the length of the recording phase of the answering cycle.

To provide a method of constructing said timing means whereby a tone signal is sounded immediately as the record-in phase of the answering cycle begins and at predetermined time intervals thereafter, said time intervals being adjustable through a limited range.

To provide means whereby a tone warning used as a signal to the calling party to begin speaking, is impressed on the terminal groove of the talkout record at the time said record is recorded.

To use a simple and economical means, such as a small motor, for driving the recording arm transversely across the record.

To furnish, as a safety feature, indicating means whereby visual evidence is shown the operator of the device when said device is properly set up to answer incoming calls.

To provide an improved cycle of operations in a device of the character described.

To provide an improved combination limit switch and timer in a device of the character described.

The invention is herein disclosed by way of illustration as embodied in a disc record type phonograph. It will be understood, however, that many features herein described are applicable to other types of phonographs such, for example, as those employing wire and tape records. The modifications necessary to adapt many features of the invention as herein disclosed to such wire and tape recorders are obvious to those skilled in the art and therefore not described herein, the invention being as defined by the appended claims where applicable to any type of sound recording and reproducing apparatus.

GENERAL DESCRIPTION

Figure 1:
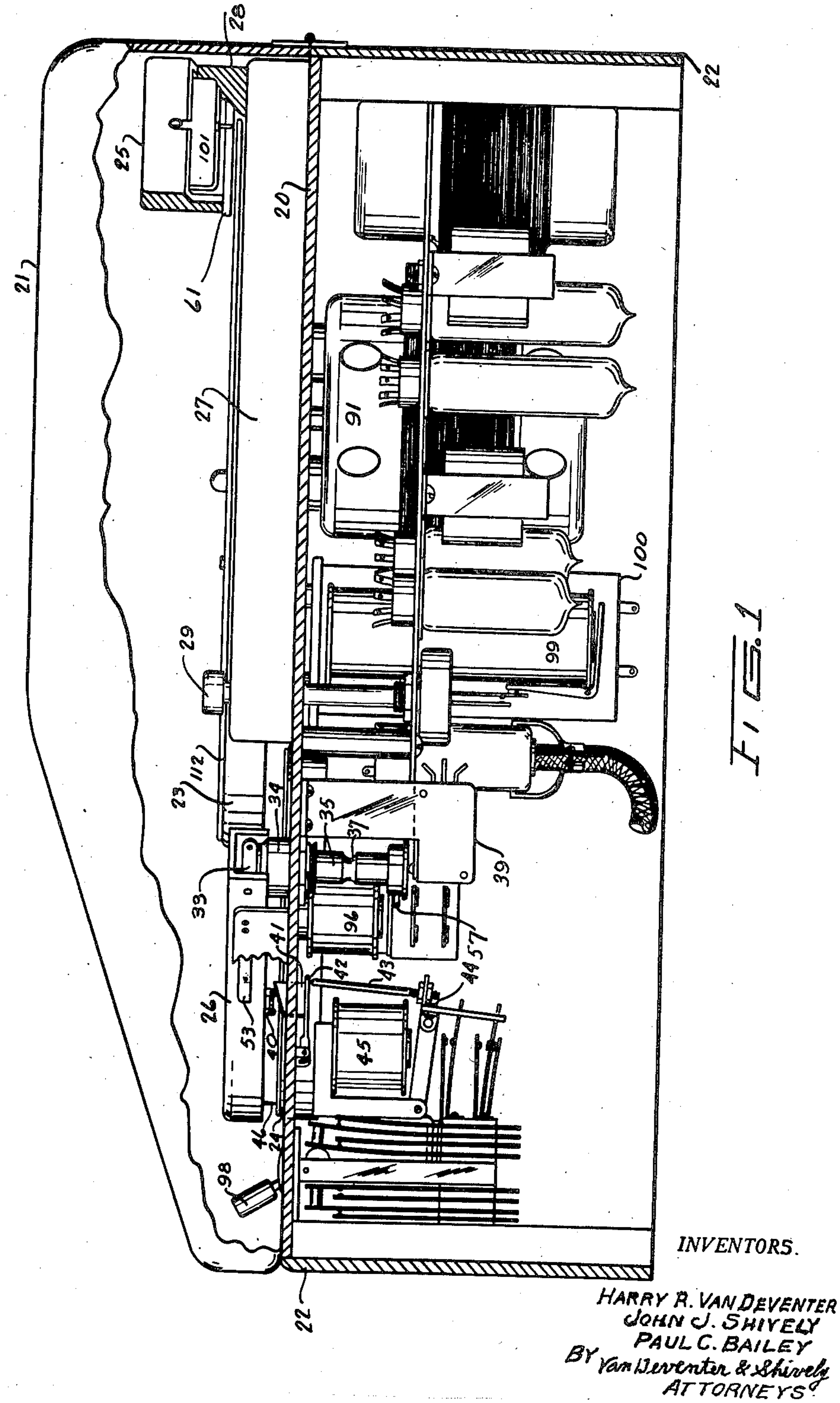
Fig. 1 is a side elevational view (with some parts cut away) of an instrument embodying the invention.

Referring to Fig. 1, the numeral 20 denotes a chassis upon which are mounted the components of the device, except the telephone instrument. This chassis may be provided with a cabinet, which may assume any desired form, the cover or lid thereof being shown as 21; the four sides, separately removable, are indicated at 22. Upon the top of the chassis are mounted the large turntable 23, the small turntable 24 (hereinafter referred to as the talkout turntable), the recording arm 25, the playback arm 26, and various controls to be presently described.

Figure 2:
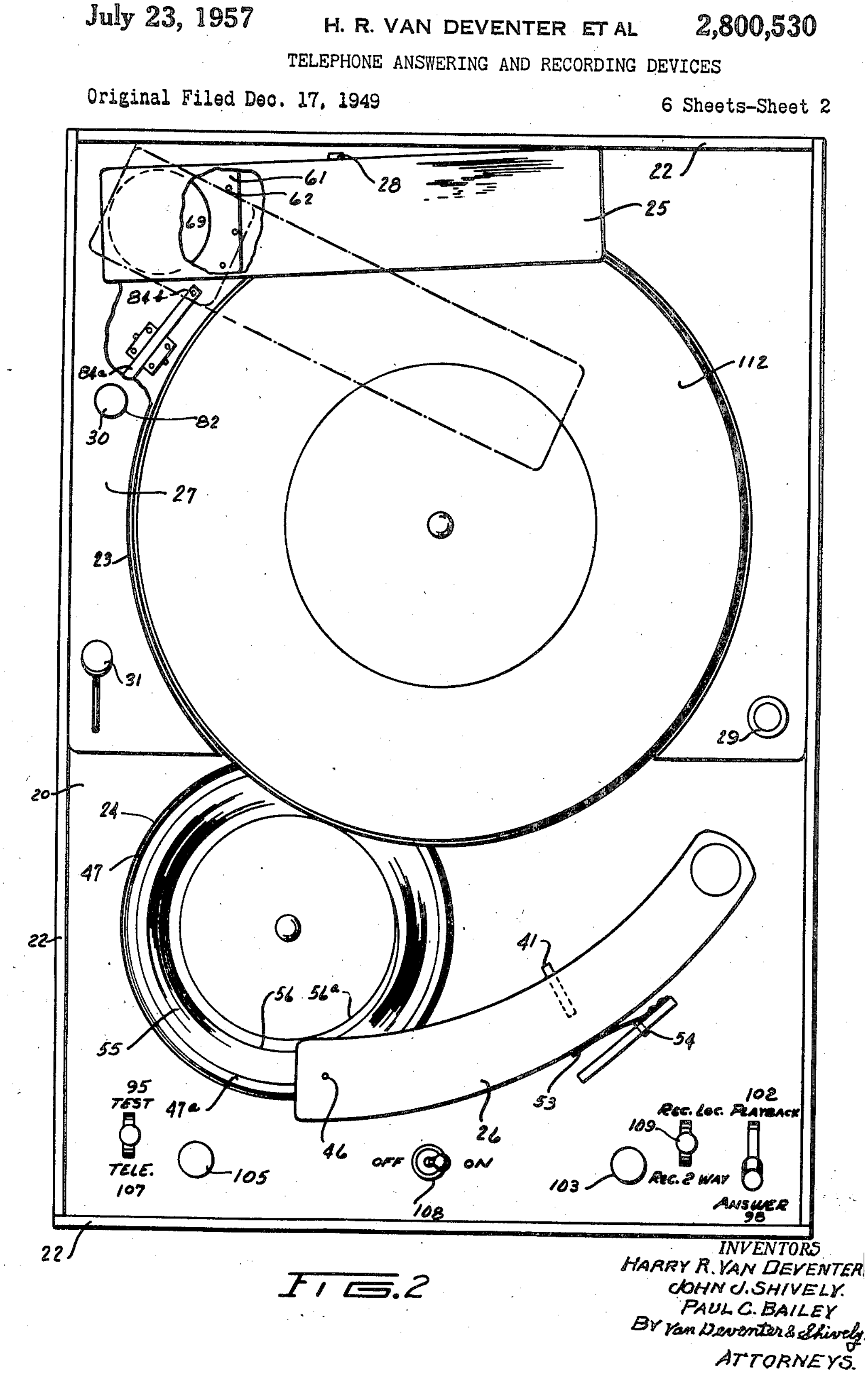
Fig. 2 is a top view of the invention shown in Fig. 1.
Figure 10:
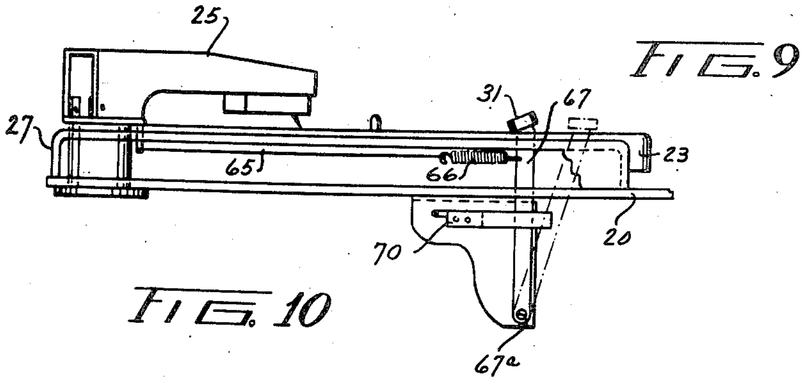
Fig. 10 is a detail view of the means for making the terminal groove in the talkout record shown in the preceding figures.

The large turntable 23 is partially surrounded by a false top 27 upon which are located the recording arm rest 28, the playback volume control 29, the push button 30 for fixing the starting point of the talkout record, the knob 31, as shown in Figs. 2 and 10, for making the terminal groove at the end of the talkout message. These parts will be presently described.

Figure 13:
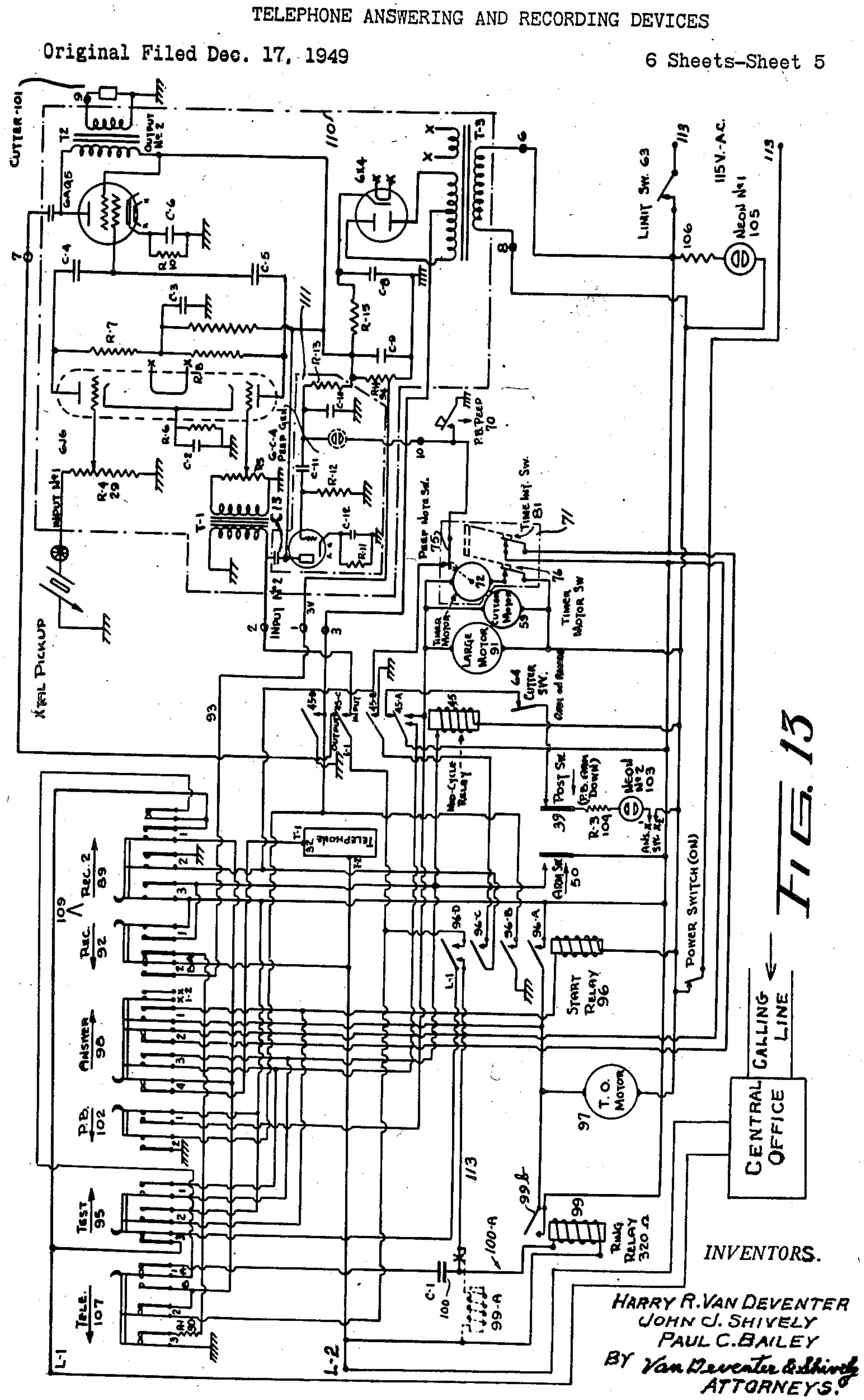
Fig. 13 is a wiring diagram of a complete instrument embodied in the invention.

A telephone 32, Fig. 13, is separate from the machine and connected thereto by the usual telephone cord. This telephone instrument may be of any suitable construction, preferably of the so-called French type and is complete with the usual hook switch, ringer, handset consisting of transmitter and receiver, induction coil, condenser and other parts usually found in standard telephone instruments.

*Cyclic control mechanisms*

Figure 3:
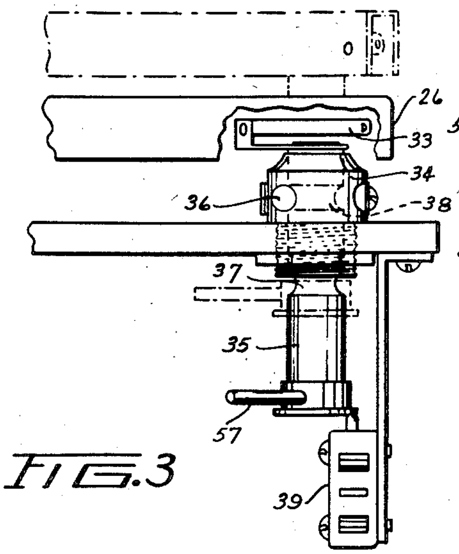
Fig. 3 is a detail view of the playback arm post and indicator switch used in the instrument shown in the foregoing figures.

The playback arm 26 is pivoted vertically in its supporting member 33 and horizontally in its post 34 as shown in Figs. 1 and 3. Supporting member 33 is attached to a hollow shaft 35 which slides freely in post 34 so that the playback arm may be raised to the higher plane of the large turntable when necessary to play back messages which have been recorded thereon, said function to be presently described.

The playback arm 26, as indicated in Fig. 3, is held in its raised position by means of a spring pressed ball 36 which is forced into a groove 37 when the arm is raised. A similar groove 38 holds the arm down in its lowest position, at which position a switch 39 is operated for a purpose hereinafter referred to.

As shown in Fig. 1, a roller 40 is secured beneath the playback arm 26 at a point about half way between the two ends thereof. Said roller rides on the upper edge of the blade 41 of a lever 42. Lever 42 is hinged at its forward end and is contacted at its opposite end by an adjustable finger 43 which is attached to the free end of the armature 44 of a relay 45. Blade 41 is so constructed that its gradient, with relay 45 energized, is of sufficient angle to permit the playback arm 26, by means of its own weight, to ride down its slope on roller 40. The height of blade 41 is so adjusted that at its lowest point and with relay 45 energized, the needle 46 of the playback element is clear of the talkout record 47.

Figure 7:
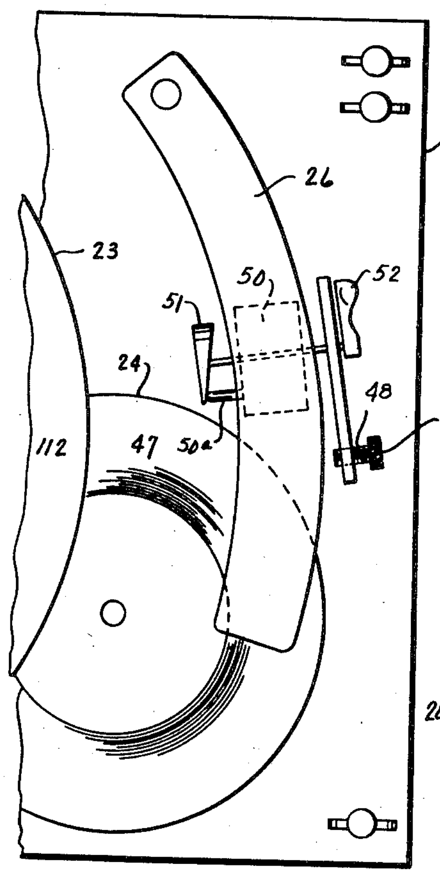
Fig. 7 is a view of the means provided for manually adjusting the position of the playback arm shown in the preceding figures.

It will be seen that, when the playback arm has traveled across the record 47 in its normal manner and relay 45 is energized in a manner hereinafter described, said playback arm will be raised from the record and returned to a position above the starting point of the recorded message thereon, said position as shown in Fig. 7 being laterally adjustable, in one form of the device, by means of a screw 48 and knob 49.

From the foregoing it will be evident that the arm 26 is mounted for horizontal and vertical movement over the record 24 and that in starting position the reproducer needle 46 is in engagement with the record.

When an incoming call operates relay 99, thereby energizing relay 96, the T. O. motor 97 is energized through contacts 96–E and back contact of 45–A, said motor moving the record 47. The needle 46 has been resting on the unrecorded area found at the outer edge of all disk recordings, and said needle moves inwardly because of the fact that arm 26 moves in a radius longer than the tangent from its pivot point 34 to its circle of contact with the record, and engages the sound track 55. At the end of this recording (or at the end of the signal recording 56 as hereinafter described) the control means 41 operates to lift the arm 26 to permit same to return to an intermediate position immediately above its starting position; when in said intermediate position the needle 46 is held out of contact with the record, and is only lowered to make contact therewith when relay 45 is disengaged at the end of the answering cycle.

The arrangement just described insures that when the arm drops at the beginning of a talkout message, the needle 46 strikes on the plain surface 47A of the record and not in the recording grooves 55. This prevents damage to the recording which would otherwise occur from repeated dropping of the needle 46 thereon.

In the same form of the device, when the arm 26 has traversed the message recorded on record track 55, adjustable means must be provided to operate a switch 50 which is located inside of the arm 26 and has an operating plunger 50A extending through the rearward side of the arm. The adjusting means as shown in Fig. 7 comprises a rotatable cam 51 with a varying edgewise thickness which when turned by a lever 52, has the effect of increasing or decreasing the distance the playback arm 26 must travel before the switch 50 is operated by the transverse movement of said arm. This provides an adjustment for talkout messages of varying lengths.

Figure 4:
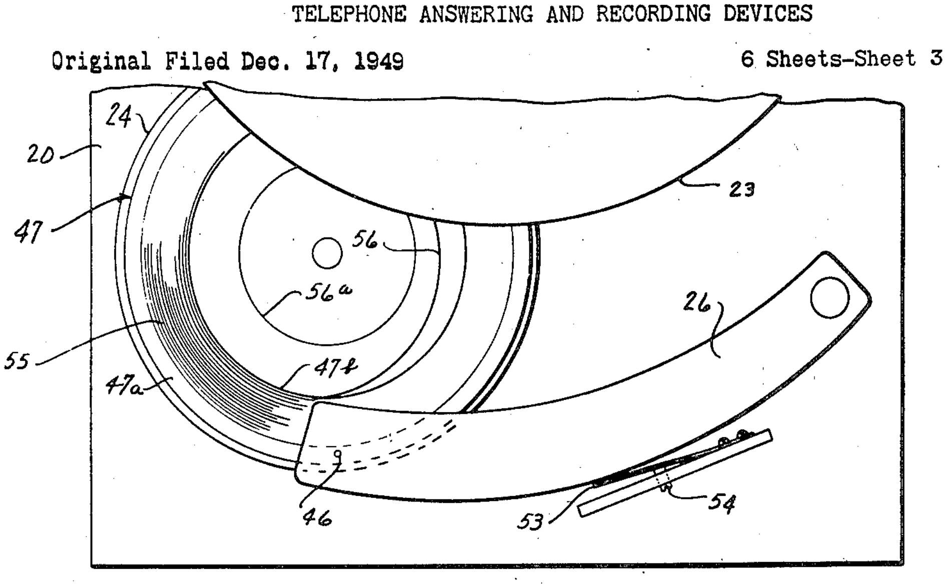
Fig. 4 is a detail top view of the arm shown in Fig. 3 and shows a starting spring applied to said arm and the terminal groove engaged by the reproducer carried by said arm.
Figure 5:
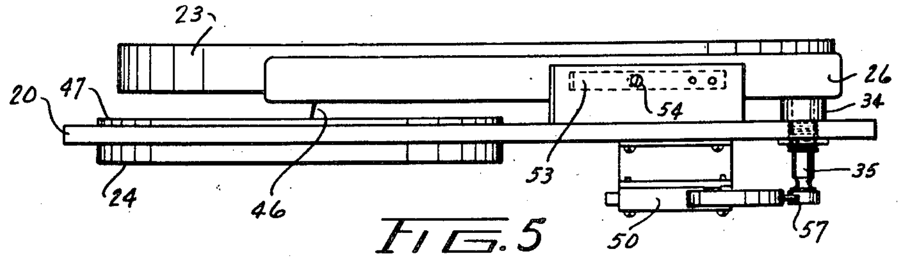
Fig. 5 is a side view of the arm Fig. 4.

In Figs. 4 and 5 is shown a means for accomplishing the operation of the switch 50 without the need of the manual adjustment 51, 52 above described. These figures also disclose means for eliminating the manual adjustment of the starting point of the talkout message.

The needle 46 of the playback arm 26 is shown as resting in the clear area 47A on the outer edge of the record 47, while the arm rests against a flat spring 53, the tension of which is adjustable by means of a screw 54. While the machine is idle, the needle 46 is held in the clear area 47A by friction, but when the turntable 24 begins to move, the friction is overcome by the tension of spring 53 which urges the arm across the record. The spring 53 exerts only a slight pressure and the arm 26 leaves the spring soon after entering the first groove of recording 55. The spring 53 is used mainly to insure operation with records of varying surface characteristics. After traversing the record in the usual manner, the needle 46 of the playback arm 26 enters a comparatively sharp spiral groove 56, hereinafter termed the terminal groove, which is made after the talkout message 55 has been recorded in a manner to be presently described. The terminal groove 56 has the effect of speeding up the transverse motion of the arm 26 across the record so that a finger 57 as shown in Figures 3 and 5 is urged into engagement with switch 50, which latter is adjusted so that it will be operated at the extreme end of the usable part of the record. Switch 50 is in the same effective position in the wiring circuit, Fig. 13, with either one of the above-described operational arrangements.

From the foregoing it will be evident that with the second-described arrangement, a talkout message of any length within the limits of the record, may be made with no adjustments necessary at its starting points. The relative pitch of the sound track 55 and the terminal groove or signal track 56 may be anything desired and the pitch of such tracks could be alike except that if 56 is the same pitch as 55 too much time will be lost after 47 ends and the operation of the reproducer ceases. It is therefore preferable that track 56 may be completed within 1½ to 2 revolutions of record disc 22 to cover the distance from the end 47B of the sound track, to the center portion 56A of the record blank which is not used. The greater the pitch of track 56, the sooner the operation of the talkout operation is concluded after the recording on 55 is delivered.

Figure 6:
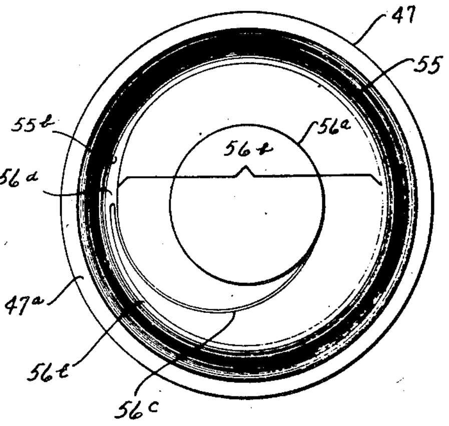
Fig. 6 is a view of an alternate means constituting the terminal groove for the reproducer Figs. 4 and 5.

An alternate form of obtaining a quick movement of arm 26 upon completion of the talkout recording or sound track 55 is to provide a control disc 56B (Fig. 6) of thin material having a slot or groove 56C therein. This groove 56C corresponds to groove 56 previously referred to. This disk 56B overlies the center portion of the record blank 47 so that the beginning 56D of the groove 56C is adjacent the end 55B of the sound track 55.

When the needle 46 leaves the track 55 at 55B it immediately enters the track 56C the movement being accomplished by means of the offset tangent of the arm as previously described. Said track can be either a deep cut or a groove that will quickly and firmly move the needle and the entire arm 26 inwards to cause instant action of switch 50 to start the recording cycle.

By the aforesaid means greater lateral force can be applied to needle 46 than if the comparatively shallow groove 56 in the record blank 47 is employed, and an additional advantage is that when the blanks 56B are employed it is not necessary to form groove 56 in the talkout record blank 47.

*Recording mechanism*

Figure 8:
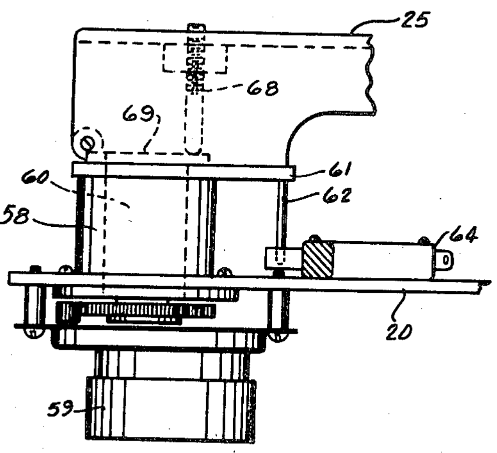
Fig. 8 is a side view partly in section of the recording arm and driving mechanism therefor used in the instrument shown in Figs. 1 and 2.
Figure 9:
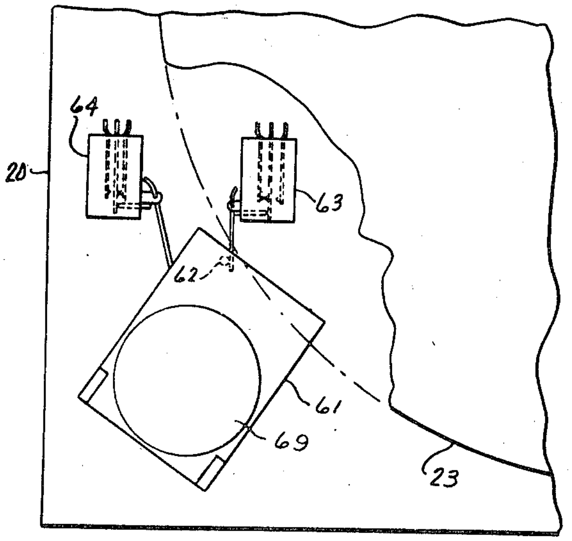
Fig. 9 is a top view of the arm drive shown in Fig. 8 with the arm 25 removed.

Referring to Figs. 8 and 9 it will be seen that the mechanism of the recording arm 25 includes clutching means similar to that described in pending application Serial No. 30,538, filed February 2, 1948, the arm being horizontally pivoted to a shoe 61 and having a screw 68 adapted to frictionally engage a clutch disk 59 on the upper end of a swivel shaft 60, the latter being journalled in a hollow post 58. However, the means used to drive the mechanism is novel. A motor 59 of suitable speed is geared to the lower end of the swivel shaft 60, being adapted to drive the arm 25 transversely across the record when the arm is clutched to the shaft 60 as described in the above-noted application. It is understood that if desired, a suitable gear-motor may be directly connected to the shaft 60.

Near the outer edge of pivot shoe 61 is attached a pin 62 extending downward toward the chassis 20. Said pin is in operable relationship with a switch 63 which acts as a limit switch when the recording arm 25 approaches the inner extremity of the record, cutting off all current to the machine. When the recording arm is moved to the outer extremity of the record, the pin 62 operates an indicator switch 64, the function of which is presently to be described.

In one form of the machine, referring to Fig. 10, one end of a cord 65 is attached to the pin 62, the other end of said cord being connected through a coil spring 66 to a lever 67, pivoted at a point 67A below the chassis. The lever 67 is surmounted by the knob 31 so that when the lever is pulled forward, the tension of the spring 66 is sufficient to overcome the friction between the clutch screw 68 and the clutch disc 69 in the recording arm mechanism, thus slipping the arm toward the center of the record. Simultaneously, when the lever 67 is pulled forward, a switch 70 is closed which impresses a tone signal on the terminal groove, the tone signal functioning as a notice to the calling party to begin speaking.

*Timing mechanism*

For certain types of service, two functions of the machine must be of definite interval so that a timing device may be necessary. First, the recording or message taking phase of the answering cycle must be limited to a definite time for each incoming call. Secondly, it may be desired to repeat the tone warning signal at regular intervals during two-way conversation recording. By limiting the normal automatic record-in time to a predetermined suitable length, one timer 71 may be used for both functions.

Figure 11:
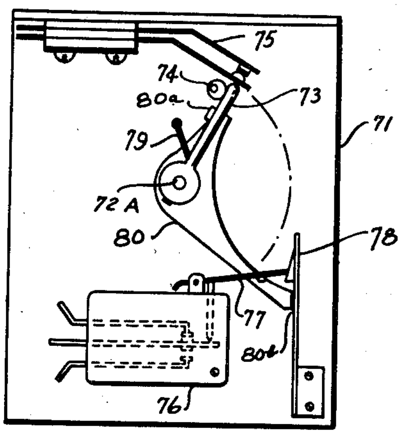
Fig. 11 is a front view of the timer used in the instrument Figs. 1 and 2.
Figure 12:
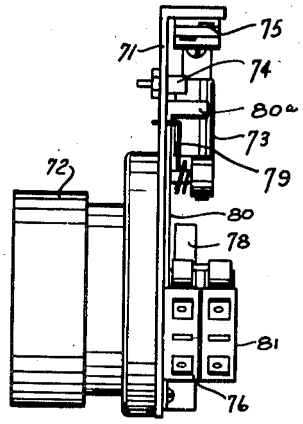
Fig. 12 is a side view of the timer shown in Fig. 11.

Figs. 11 and 12 show a motor 72 having a shaft 72A which drives an arm 73 which, while at rest against its adjustable stop 74, holds contacts 75 closed, causing a signal to be generated as soon as relay 45 is energized, thus completing the tone signal circuit through contacts 45B on the relay 45. Simultaneously, the motor 72 is energized through contacts 45A on relay 45 and through its controlling switch 76. The motor 76 is of the synchronous clutch type which, when deenergized, mechanically disconnects its gear train from its armature, allowing the arm 73 to move freely, so that when the arm operates the switch 76, a lever 77 of the switch 76 has been moved under a hook 78 which holds switch 76 open while the arm 73 is returned to its starting position by means of a spring 79. In springing back to its starting position the arm 73 moves a lever 80 by means of a forward extension 80A thereof. The lever 80 is pivotable around the shaft of the motor 72 so that, in being moved counterclockwise by the return of arm 73, another extended portion 80B engages the hook 78, thus moving the latter away from the lever 77, allowing the switch 76 to assume its normal position by means of its own internal spring. The switch 76 is of the normally closed type so that in normal position, voltage is again applied to the motor 72 and the foregoing sequence repeats and will continue to repeat as long as the aforementioned circuits are energized. This repetition may be desired for tone signal timing in recording a two-way conversation.

A reference to Fig. 12 will show another switch 81 ganged to the switch 76, switch 81 being the interval control switch for the recording phase of the answering cycle. When the switch 81 is opened by the arm 73, all relays are de-energized and the device is re-set for the next call. As switch 81 is used only on the answering function of the machine, its contacts are shunted out on all other functions by means of a pair of normally closed contacts 98–2 on the answering key 98, Fig. 13.

*Mechanism to fix the starting point of the talkout record*

Figure 15:
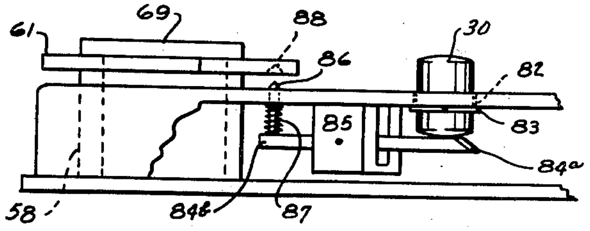
Fig. 15 is a detail view of the push button mechanism used in locating the position of the recording arm when same is used to record the talkout record.

Referring to Fig. 15, the push button 30 extends through a hole 82 in the false top 27 and is restrained in its upward movement by a spring clip 83. The lower end of push button 30 rests on one end 84A of a lever 84 which is fulcrumed in a block 85. The opposite end 84B of lever 84 engages a pin 86 which is forced downward thereon by means of a compression spring 87. At the proper location on the under side of the pivot shoe 61, a hole 88 of diametrical size to fit the pin 86 is drilled only partially through said pivot shoe. It will be obvious that, when push button 30 is pressed and arm 25 is moved into starting position, pin 86 will enter the hole 88, thereby holding the recording arm at that particular point. The use of this mechanism to fix the starting point of the talkout record eliminates needless fumbling on the part of the operator and standardizes the width of the clear area on the outside edge of the record 47.

OPERATION

The operation of the machine is best described as a sequence of functions in the order in which they are most likely to be used.

*Using the machine to record a two-way conversation*

A switch 89, Fig. 13, is closed by throwing a 3-position key 109, Fig. 2, to the position labelled record two-way. One pair of its contacts 89–1 connects side T–1 of the telephone 32 to side L–1 of the telephone line. The circuit of T–2 and L–2 is permanently connected, there being no necessity of switching both sides of the circuit. Contacts 89–2 close the circuit to the automatic tone warning switch 75 and contacts 89–3 energize relay 45, said relay being held in energized position only by said contacts 89–3, the locking or holding contacts 45–A being only in circuit on Answer and Test presently to be described. A resistor 90 is inserted in series between the telephone 32 and the chassis ground so that the output level of the local phone and that of the incoming signal will be equalized. Said resistor will be hereinafter shown as being disconnected when the machine is being used only as a telephone.

The sequence, then, which follows the closing of switch 89 can be traced in Fig. 13 as the ensuing:

(A) The telephone is connected to the telephone line.

(B) Relay 45 is energized, setting up the voice circuits for recording.

(B–1) A motor 91 is energized, moving the large turntable 23.

(B–2) The motor 59, which drives the recording arm 25, is energized.

(B–3) The motor 72, which controls the repetition of the tone warning signal, is also energized.

Therefore, to use the machine for the purpose of recording a two-way conversation, the following operations are necessary; the operator of the machine is using the telephone, so that the telephone switch 107 is closed. When he wishes to record the two-way conversation, he places a record blank 112 on the large turntable 23, puts the recording arm 25 in position on said blank, closes the two-way switch 89 and opens the telephone switch 107. Any speech on the telephone line, including that of the local station is then recorded on the blank.

*Recording locally using the telephone handset as a microphone and speaker*

When switch 92 is closed, Fig. 13, its contacts 92–1 energize the relay 45. The spring of contacts 92–2 disconnects the chassis ground from T–2 and inserts a voltage in series with said T–2. This voltage, necessary with any standard carbon microphone or telephone transmitter is obtained through wire 93 from a tap on a resistor 94 in the power supply of amplifier 110. The sequence of operations with this switch position is the same as with switch 89 excepting that the telephone line is not connected to the telephone, and that a voltage is applied to said telephone being disconnected by contacts 89–1 in switch 89 so that it may be used independently of the telephone line.

Therefore, when the operator wishes to use the machine for recording locally, for the purpose of dictation, memos, etc., the following operations are necessary: A blank 112 is placed upon the large turntable 23, the recording arm 25 is put into position on the blank, the handset of telephone 32 is held in readiness in one hand, while the record local switch 92 is closed. Thereupon, any speech spoken into the handset is recorded on the blank.

*To make the talkout record*

A small record blank is placed on the large turntable 23 and the "start talkout" push button 30 is held down with one hand while the recording arm 25 is moved inward. When the arm has stopped at its starting point above the talkout record, as previously described, the arm is lowered to said record and the push button is released. The telephone handset is lifted as the record local switch 92 is closed and the telephone transmitter is used as a microphone for recording and talkout message. At the end of the message, the "end of talkout" lever 67 is pulled toward the operator, making the aforementioned terminal groove 56 and impressing on said groove the before-mentioned tone signal.

*Testing the talkout record*

After the talkout record has been made, it should be played through, not only to ascertain whether or not the wording is correct, but, in one form of the machine, to make the necessary adjustments at the beginning and end of the message. In this particular form of the machine, the talkout test is made with the talkout record on the small turntable and by the use of the test switch 95. In closing the test switch 95, one pair 95–1 of its contacts closes the holding, or locking circuit of relay 45 so that said relay may be locked in the same manner as during the answering cycle to be described hereinafter. Another pair of contacts 95–3 disconnects L–1 from T–1, and a third pair 95–2 energizes the starting relay 96 which, through its contacts 96E and the back contact 45A, relay 45 starts the motor 97 which moves the small turntable 24. The knob 49 has been so adjusted that the needle of the playback arm 26 is positioned near the first groove of the message so that after the turntable 47 begins to move, the arm will traverse the record in the usual manner. At the end of the talkout message, the cam 51 is adjusted by means of lever 52 so that the mid-cycle shift of circuits occurs at the proper point. When said shift occurs, the playback arm is raised by means of relay 45 and returned to its starting position as previously described.

The interval timer does not operate on test, as its contacts 81 are shorted out by the normally closed contacts 98–2 of switch 98, it being unnecessary to wait for the machine to go through the recording phase of the cycle.

The sequence then, which follows the closing of switch 95 is as follows:

(A) Starting relay 96 is energized.

(B) Motor 97 starts.

(C) Arm 26 traverses the talkout record 47 in the usual manner.

(D) Switch 50 is operated by the movement of the arm 26.

(E) Relay 45 is energized, returning arm 26 to its starting position.

In the preferred form of the machine previously described which has no adjustments at the beginning and ending of the talkout message, it is only necessary to check the correctness of the wording, which may be done on the large turntable 23 using the playback switch 102. Obviously, the test switch 107 is eliminated in this form of the machine. After testing the talkout record, the machine is set up for answering incoming telephone calls.

*To use the machine for answering incoming telephone calls*

The principal function of the device is to answer incoming telephone calls and, as such, involves considerations not normally met in simple telephone recorders. A necessary principle of the invention is to provide a machine which for the convenience of the telephone companies, upon being connected to their lines, will not change the measured balance thereof. In addition to the telephone ringer which is contained in the separate telephone instrument, there is a ringing relay 99 connected across the telephone lines L–1 and L–2, Fig. 13. It naturally follows that the test taken on this line, if it were left simply with the above two parallel pieces of apparatus across the line, would differ from that taken on a line to which was connected simply a telephone with its associated ringer. As will presently be described, the ringing relay 99 is necessary to the successful operation of the device, so that the telephone circuit with its associated ringer must be dispensed with while the machine is used to answer incoming calls. Also, in dispensing with the telephone circuit, means must be provided whereby an inductance of a value high enough to offer impedance to voice currents and a D. C. resistance of a value low enough to operate the supervisory or other relay at the telephone exchange, be shunted across the telephone line while the machine is going through its cycle. In closing switch 98, one pair 98–1 of its contacts closes the holding circuit on relay 96. Another pair 98–2 opens the shunt circuit across the interval timer switch 81. Still another contact pair 98–3 closes the holding circuit on relay 45. Yet another pair 98–4 disconnects the telephone circuit from the telephone line. This leaves simply the ringing relay 99 and its associated condenser 100 across the telephone line.

When a call is received, the ringing relay 99 is energized by the ringing current, closing its contacts 99R which causes the starting relay 96 to be energized. Said starting relay is held in energized condition by means of its holding contacts 96A, contacts 98–1 of switch 98, said contacts 96A also controlling the talkout motor 97. At the same time, contacts 96B close the negative circuit of the amplifier power supply so that said amplifier is powered and contacts 96D connect L–1 into the output of the amplifier 110 through contacts 45–C of the relay 45. A reference to Fig. 13 will show that contacts 96D also shunt out the ringing condenser 100 and place the coil of relay 99 directly across the telephone line, in such a manner as to effectively operate the supervisory relay at a manually operated telephone exchange as soon as relay 96 is energized. An alternate method is shown in dotted line in Fig. 13. A coil 99–A having the same effective impedance value as the telephone in off-hook condition is connected between the L–2 side of the telephone line and conductor 113. Said conductor 113 is disconnected from conductor 100–A at X so that when relay 96 is energized, closing its contacts 96D, coil 99A is placed across the telephone line rather than the coil of the ringing relay 99. Coil 99A may be of relative low D. C. resistance and have a high impedance to voice currents. Obviously, this arrangement will maintain the relays in an automatic telephone system in their proper operative condition much the same as would occur in such a system with the called subscriber's telephone off the hook. Contacts 96E of relay 96 close to energize the motor 97. After the playback has delivered the talkout message to the calling party, the playback arm 26 swings into the previously described terminal groove 56, the latter causing relay 45 to be energized, lifting the playback arm from the record as previously described. The said relay 45 is held in energized condition by means of its contacts 45–A which contacts also supply current to the motor 51, the recording arm motor 59, and the combination timer motor 72. Contacts 45–B, contacts 96C on relay 96 complete the circuit for the previously described tone warning signal, the actual signal voltage being generated by an oscillator circuit 111 grouped with the amplifier 110, while contacts 45–C switch the telephone line from the output of the amplifier 110 to the input of the same, so that any speech on the telephone line will pass through the amplifier 110 to the recording head 101. Contacts 45–D function only on the record local switch 92 and the record two-way switch 89, being used only to energize the power supply on these functions, the back contact 45A de-energizes the talk-out motor 97. Therefore, to use the machine to answer the telephone and take incoming messages, a large record blank 112 is placed on the large turntable 23, and a small record 47 upon which has been recorded a talkout message as previously described, is placed on the talkout turntable 24. The recording arm 25 is placed in position on its associated record and the playback arm 26 is placed at rest against the spring 53, after which the answer switch is closed, all other switches being open.

Figure 14:
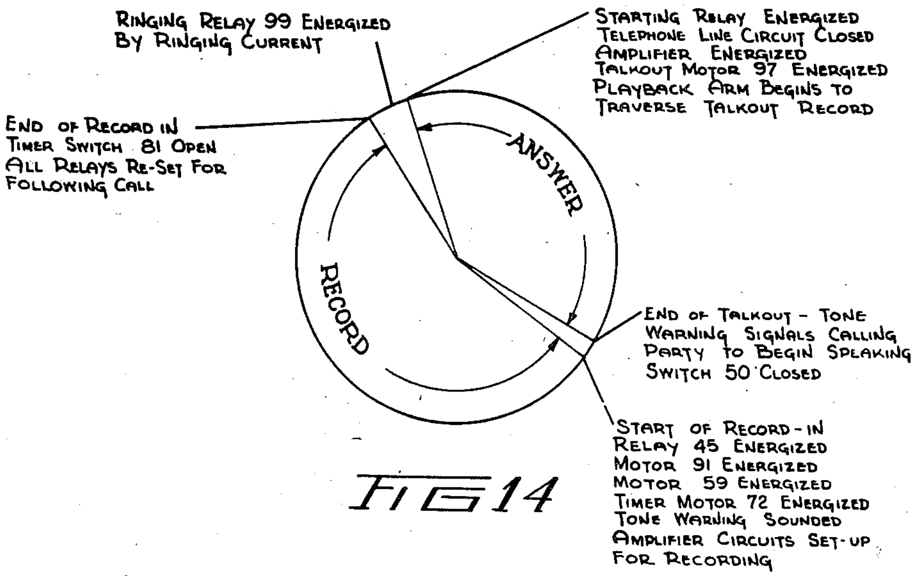
Fig. 14 is a diagram illustrating the sequence of the operations of the instrument and instrumentalities shown in the preceding figures.

The sequence of operations is best followed through by referring to the polar diagram in Fig. 14.

*Playing back messages that have been recorded over the telephone line*

When the switch 102 is closed, one pair of its contacts 102–1 energizes the motor 91. Also energized, but ineffective, are motors 59 and 72. The motor 59 is ineffective by reason of the fact that when playing back, the recording arm has been placed back on its rest, which act separates the clutch screw 68 from its driving disc 69. The motor 72 is ineffective by reason of the fact that though it will actuate the timer 71 as heretofore described, the contacts 75 which control the tone warning signal are not in circuit and the interval timer switch 81 is shunted out through contacts 98–2 on the answer switch 98. Another pair of contacts 102–2 closes the negative side of the amplifier power supply thus energizing the amplifier 110. The sequence, then, which follows the closing of switch 102 is as follows:

(A) Motor 91 is energized, moving the large turntable 23.

(B) Amplifier 110 is energized.

Therefore, when the user wishes to play back messages from the large turntable, the following operations are necessary:

The playback arm 26 is grasped near its pivot and raised until the ball 36 falls into the groove 37, at which point the arm is on the proper plane for use on the large turntable. The arm 26 is placed on the desired message on the large record and, with the telephone handset held to the ear, the playback switch 102 is thrown.

*Safety features*

Several features have been incorporated to assist in eliminating mistakes in the using of the machine. One of these is the neon light 103, Figs. 2 and 13. A switch 39 is positioned below the playback arm pivot post 34 in such a manner as to be operated only when the playback arm is down in its normal position for use on the talkout turntable 24. Another switch 64 is operated as previously described, by the recording arm 25 when said arm is placed on its associated record. In the same circuit is a pair of contacts X–1 and X–2 included in the answer switch 98. The switches 39 and 64, contacts X–1 and X–2 and the neon light 103 with its associated dropping resistor 104 are all in a series circuit relationship with one another, so that in order that said neon light 103 may glow, thus indicating that the machine is correctly set up for answering the telephone, both arms 25 and 26 must be in position on their respective records and the answer switch 98 must be closed. A second neon light 105 is in the usual pilot light for the purpose of indicating whether or not the power is turned on. Voltage to the neon light 105 is supplied through a dropping resistor 106 from the current supply lines 113.

*Using telephone only*

A switch 107 is closed, while the power switch 108 may be opened, though this is not necessary. One set 107–1 of contacts on the switch 107 disconnects the ringing relay 99 from L–1 and connects the telephone instrument 32 to L–1. Another pair of contacts 107–2 disconnects the amplifier 110 from the telephone 32, while yet another pair 107–3 disconnects the chassis ground and series disconnector 90 from L–2, so that while this switch 107 is in use, there is nothing connected to the telephone line but the telephone instrument. Any standard telephone instrument can be used with no changes whatever in its parts or wiring.

While the invention has been described as applied to a metallic telephone line circuit, it will be understood that it can be used equally well over other circuits and over party lines by connecting the starting relay 99 from either line to ground or by making any other connection on said relay to one or both sides of the telephone circuit so that it will respond as desired to incoming ringing currents.

What is claimed is:

1. In an automatic telephone answering device for recording messages at an unattended telephone station, in combination, a telephone line circuit, a phonograph having a ringing relay having contacts, a condenser in series with said relays and bridged across said line, a source of power, a starting relay in circuit with said source and said contacts in said ringing relay, said starting relay adapted to start the operation thereof and connect same to said line circuit for operation thereover, and means including a circuit and additional contacts on said starting relay for connecting the winding of said ringing relay across said line circuit to act as a direct current shunt thereon while said phonograph is in operation.

2. In an automatic telephone answering device for recording messages at an unattended telephone station, in combination, a telephone line circuit, a phonograph having a ringing relay having contacts, a condenser in series having contacts and bridged across said line, a source of power, a starting relay in circuit with said source and said contacts in said ringing relay, said starting relay having contacts, means including a circuit and said source of power and said last contacts connected to said phonograph and adapted to start the operation of said phonograph and connect same to said line circuit for operation thereover, and means including a circuit and additional contacts on said starting relay for connecting a direct current shunt across said line circuit while said phonograph is in operation.

3. In an automatic telephone answering device for recording messages at an unattended telephone station, in combination, a telephone line circuit, a reproducing phonograph, means operated by current flowing in said circuit for connecting said phonograph thereto to deliver speech to said circuit, an impedance coil, and means controlled by the operation of said first means for connecting said coil across said circuit, said coil having a high impedance to voice currents and a relatively low impedance to direct current flowing in said circuit to simulate the values of a telephone in off-hook condition across said circuit.

4. In an automatic telephone answering device for recording messages at an unattended telephone station, in combination, a telephone line circuit, a recording phonograph, means operated by current flowing in said circuit for connecting said phonograph thereto to record speech delivered to said phonograph via said circuit, an impedance coil, and means controlled by the operation of said first means for connecting said coil across said circuit, said coil having a high impedance to voice currents and a relatively low impedance to direct current flowing in said circuit to simulate the values of a telephone in off-hook condition across said circuit.

5. In an automatic telephone answering device for recording messages at an unattended telephone station, in combination, a telephone line circuit, a recording phonograph mechanism having a movable record blank and a motor for moving same, means operable by current flowing in said circuit for connecting said phonograph thereto, movable translating means associated with said recorder to record sound thereon including a motor for moving same in timed relation to the movement of said record blank when same is moved by said first motor, a circuit including said motors and a source of current, and a limit switch in said circuit adapted to be actuated by the relative movement of said record and translating means to control the operation of both said motors.

6. In an automatic telephone answering device for recording messages at an unattended telephone station, in combination, a telephone line circuit, a reproducing phonograph having a movable record blank and a motor for moving same, means operable by current flowing in said circuit for connecting said phonograph thereto, a recording phonograph movable translating means associated with said recording phonograph to record sound thereon including a motor for moving same, a circuit including said motors and a source of current, and a limit switch in said circuit adapted to be actuated by the relative movement of said record and translating means to control the operation of said three motors.

7. In an automatic telephone answering device for recording messages at an unattended telephone station, in combination, a telephone line circuit having a telephone instrument normally connected thereto, a talkout phonograph having a starting and another position, a recording phonograph having a starting and another position, a circuit and control means therein whereby said phonographs are connected to said telephone line circuit for sequential operation upon receipt of a signal thereon, a signal device, and means controlled by said phonographs for operating said signal device to indicate when said phonographs are both in said starting position.

8. In an automatic telephone answering device for recording messages at an unattended telephone station, in combination, a telephone line circuit having a telephone instrument normally connected thereto, a reproducing phonograph having a reproducer arm mounted for horizontal and vertical movement over a record, said arm normally being at rest on starting position with the reproducer in engagement with said record, electrically operable means including a relay responsive to ringing current flowing in said line for connecting said phonograph to said telephone circuit and for starting the movement of said record to permit said reproducer to traverse same to reproduce sounds recorded thereon to said circuit, a second electrically operable means to lift said arm from said record and return same to said starting position, and means for stopping the movement of said record and disconnecting said phonograph from said telephone circuit.

9. In an automatic telephone answering device for recording messages at an unattended telephone station, in combination, a telephone line circuit having a telephone instrument normally connected thereto, a device including a phonograph recorder having a motor, a control circuit and control means therein whereby said phonograph is connected to said line circuit upon receipt of signal current flowing in said control circuit, a power supply circuit connected to said motor, electronic means including an amplifier connected to said power circuit for generating a signal tone, and switch means connected to said power supply circuit mounted in said device for connecting said signal tone to said line circuit at predetermined intervals during recording.

10. The combination as claimed in claim 9 wherein said recorder has an amplifier connected thereto including a current supply transformer, and said electronic means is connected to said current supply transformer to be operated thereby.

11. The combination as claimed in claim 9 including a motor-driven timer in said device and wherein said switch means is controlled thereby.

12. The combination as claimed in claim 9 wherein a motor driven timer is provided, and wherein said electronic means is operated by said timer, said timer further controlling the operation of said phonograph and timer motors.

13. In an automatic telephone answering device for recording messages at an unattended telephone station, in combination, a telephone circuit, means responsive to ringing current flowing in said circuit for starting a phonograph, a phonograph connected to said circuit and controlled by said means, a record blank on said phonograph, a translator adapted to record speech received via said circuit on said record, means at said phonograph adapted to deliver a signal tone to said circuit at the beginning of each rceording whereby a listener on said circuit is appraised that a recording is to be recorded on said record, and means at said phonograph for disconnecting same and said signal tone means from said telephone circuit after a predetermined time period.

14. In an automatic telephone answering device for recording messages at an unattended telephone station, in combination, a telephone circuit, means responsive to ringing current flowing in said circuit for starting a phonograph, a phonograph connected to said circuit controlled by said means, a record blank on said phonograph, a translator adapted to record speech received via said circuit on said record, means at said phonograph adapted to deliver said signal at the beginning of each recording to be recorded on said record to identify said record as made by said recorder, and means at said phonograph for disconnecting same and said signal tone means from said telephone circuit after a predetermined time period.

15. In an automatic telephone answering device for recording messages at an unattended telephone station, in combination, a telephone line circuit, means responsive to ringing current flowing in said circuit for starting a phonograph, a phonograph recorder having a motor controlled by said means, a signal device, switch means driven in timed relation to said recorder for operating said device to produce a signal tone for impression on said line circuit, means for introducing said signal at predetermined intervals to said line circuit during recording thereover by said phonograph, and means at said phonograph for disconnecting same and said signal tone means from said telephone circuit after a predetermined time period.

16. The combination as claimed in claim 15 wherein said switch means includes a motor and means operated thereby for controlling the operation of said phonograph.

17. In an automatic telephone answering device for recording messages at an unattended telephone station, in combination, a telephone line circuit, means responsive to ringing current flowing in said circuit for starting a phonograph, a phonograph recorder having a motor controlled by said means, a signal device, switch means driven in timed relation to said recorder for operating said device to produce a signal tone for impression on said line circuit, switch means, means for operating said switch means in timed relation to said recorder for predetermining the length of said recording, means for introducing said signal at predetermined intervals to said line circuit during the recording thereover by said phonograph, and means at said phonograph for disconnecting same and said signal tone means from said telephone circuit after a predetermined time period.

18. In an automatic telephone answering device for recording messages at an unattended telephone station, in combination, a telephone circuit, means responsive to ringing current flowing in said circuit for starting a phonograph, a phonograph connected to said circuit controlled by said means, a record blank on said phonograph, a translator adapted to record speech received via said circuit on said record, means in said phonograph adapted to deliver a signal tone to said circuit at the beginning of each recording whereby a listener on said circuit is appraised that a recording is to be recorded on said record, means for intermittently impressing said signal tone on said circuit at spaced intervals thereafter while said recording is in progress, and means at said phonograph for disconnecting same and said signal tone means from said telephone circuit after a predetermined time period.

19. In an automatic telephone answering device for recording messages at an unattended telephone station, in combination, a telephone circuit, means responsive to ringing current flowing in said circuit for starting a phonograph, a phonograph connected to said circuit controlled by said means, a record blank on said phonograph, a translator adapted to record speech received via said circuit on said record, means at said phonograph to deliver a signal at the beginning of each recording to be recorded on said record, means for intermittently impressing said signals on said record thereafter at spaced intervals during said recording to identify said record as made by said recorder, and means at said phonograph for disconnecting same and said signal tone means from said telephone circuit after a predetermined time period.

20. In an automatic telephone answering device for recording messages at an unattended telephone station, in combination, a telephone line circuit, means responsive to ringing current flowing in said circuit for starting a phonograph, a phonograph recorder controlled by said means including an amplifier connected to said circuit, said amplifier having a current supply therein, electronic means connected to said amplifier and said current supply for generating a signal tone, switch means for impressing said tone on said circuit at predetermined intervals, and means at said phonograph for disconnecting same and said signal tone means from said telephone circuit after a predetermined time period.

21. In an automatic telephone answering device for recording messages at an unattended telephone station, in combination, a telephone line circuit, a phonograph recorder having a record, a source of current, an amplifier having a current supply driven from said current source and connected to said phonograph, electronic means connected to said amplifier and said current supply for generating a signal tone, a switch for impressing said signal tone on said record at predetermined intervals, means at said phonograph for connecting same, said amplifier and said signal tone generator to said line circuit including a relay responsive to ringing current flowing in said telephone line circuit; and means for disconnecting said phonograph, said amplifier and said signal tone generator from said line circuit after a predetermined time interval.

22. In an automatic telephone answering device for recording messages at an unattended telephone station, in combination, a communication circuit, a recording phonograph including a record blank and having a motor, means including a relay responsive to ringing current flowing in said communication circuit for connecting said phonograph to said circuit, a timer having contacts, a circuit including said contacts and said motor and adapted to determine the length of time said phonograph is connected to said circuit to record on said record blank, means for producing a signal tone and means controlled by said timer for periodically impressing said tone on said circuit to notify users thereof that said phonograph is recording thereon.

23. The combination as claimed in claim 22 including means in said timer for impressing said signal tone on said record blank at the beginning of each recording thereon.

24. The combination as claimed in claim 22 including a limit switch operated at the end of said record for controlling said timer and stopping said phonograph.

References Cited in the file of this patent

UNITED STATES PATENTS

| | | |
|---|---|---|
| 1,845,034 | Bickelhaupt | Feb. 16, 1932 |
| 2,080,812 | Fairbanks | May 18, 1937 |
| 2,221,883 | Rowe | Nov. 19, 1940 |
| 2,284,173 | Soukup et al. | May 26, 1942 |
| 2,374,842 | Shively et al. | May 1, 1945 |
| 2,503,176 | Somers | Apr. 4, 1950 |
| 2,519,568 | Handschin | Aug. 22, 1950 |
| 2,528,459 | Thompson et al. | Oct. 31, 1950 |
| 2,529,636 | Smith | Nov. 14, 1950 |
| 2,558,040 | Carter | June 26, 1951 |
| 2,658,107 | Zimmermann | Nov. 3, 1953 |